US012187054B2

(12) United States Patent
Okada

(10) Patent No.: US 12,187,054 B2
(45) Date of Patent: Jan. 7, 2025

(54) IMAGE FORMING APPARATUS AND CONTROL METHOD THEREFOR

(71) Applicant: TOSHIBA TEC KABUSHIKI KAISHA, Tokyo (JP)

(72) Inventor: Yuuki Okada, Tagata Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 147 days.

(21) Appl. No.: 17/984,688

(22) Filed: Nov. 10, 2022

(65) Prior Publication Data

US 2023/0294439 A1 Sep. 21, 2023

(30) Foreign Application Priority Data

Mar. 18, 2022 (JP) ................................ 2022-044114

(51) Int. Cl.
*B41J 29/38* (2006.01)

(52) U.S. Cl.
CPC .................................... *B41J 29/38* (2013.01)

(58) Field of Classification Search
CPC .......... H04N 1/00344; H04N 1/00079; H04N 1/0097; B41J 29/38; B41J 2/175
See application file for complete search history.

(56) References Cited

U.S. PATENT DOCUMENTS

| | | | | |
|---|---|---|---|---|
| 8,085,415 | B2 | 12/2011 | Nagami | |
| 8,289,547 | B2 | 10/2012 | Ooba | |
| 8,300,248 | B2 * | 10/2012 | Uruta | G06F 3/1213 358/1.14 |
| 9,898,233 | B2 | 2/2018 | Kuroda | |
| 11,040,539 | B2 * | 6/2021 | Shiratori | B41J 2/175 |
| 11,722,608 | B2 * | 8/2023 | Ogura | H04N 1/32694 358/1.14 |

* cited by examiner

*Primary Examiner* — Lam S Nguyen
(74) *Attorney, Agent, or Firm* — Kim & Stewart LLP

(57) ABSTRACT

According to an embodiment, a controller of an image forming apparatus collects data relating to maintenance of the image forming apparatus. If failing to collect data, the controller confirms a cause of the collection failure and sets, if the cause of the collection failure is an interruption of a print job, an image forming job as a held job. Subsequently, the controller resumes the collection of the maintenance data that the controller has failed to collect.

10 Claims, 2 Drawing Sheets

IMAGE FORMING APPARATUS AND CONTROL METHOD THEREFOR

CROSS-REFERENCE TO RELATED APPLICATIONS

This application is based upon and claims the benefit of priority from the prior Japanese Patent Application No. 2022-044114, filed on Mar. 18, 2022, the entire contents of which are incorporated herein by reference.

FIELD

An embodiment described herein generally relates to an image forming apparatus such as a printer, a facsimile machine, a copying machine, or a multi-function peripheral, and to a control method therefor.

BACKGROUND

For example, a multi-function peripheral is connected to a user terminal and a management server via a network. The multi-function peripheral collects its counter data or setting data (hereinafter, referred to as maintenance data) at predetermined timings for the purpose of maintenance, and transmits the data to the management server. The multi-function peripheral is set to inhibit collection of such maintenance data in order to prevent the damage of the data during execution of an image forming job such has a print job.

For that reason, for example, in a state where the print job in execution is interrupted (the print job is not terminated) due to paper out or the like, the multi-function peripheral fails to collect maintenance data. In this case, the multi-function peripheral collects maintenance data at a subsequent timing and transmits the maintenance data to the management server.

The print job, which has caused the data collection failure, can be resumed after the cause of the job interruption is removed (e.g., paper is refilled). However, the management server cannot receive the maintenance data of the multi-function peripheral at a predetermined timing due to the interruption of the print job.

DETAILED DESCRIPTION

Figure 1:
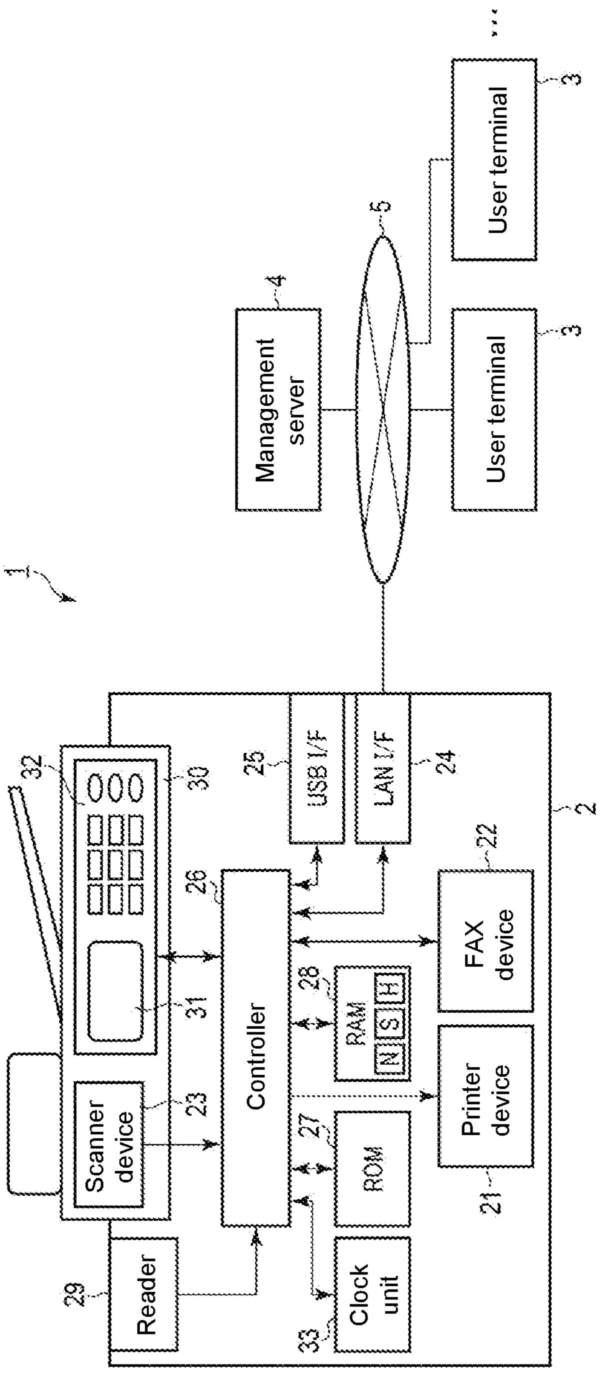
FIG. 1 is an overall configuration diagram of an information processing system including a digital multi-function peripheral according to an embodiment.

According to an embodiment, an image forming apparatus transmits maintenance data as data relating to maintenance to a management server. The image forming apparatus includes an image forming device, a memory, an interface, and a controller. The image forming device performs various image forming jobs. The memory includes a counter and a held job storage unit. The counter of the memory counts data relating to the image forming jobs executed by the image forming device, and stores the counted data as the maintenance data. The held job storage unit of the memory stores an image forming job that is set as a held job among the image forming jobs. The interface performs communication with the management server. The controller regularly collects the maintenance data from the memory. The controller confirms, if failing to collect the maintenance data, a cause of the failure of the collection. The controller sets, in response to the confirmation that the cause of the failure of the collection is an interruption of the image forming job, the image forming job as the held job. The controller resumes the collection of the maintenance data in response to the setting of the image forming job as the held job. Further, the controller transmits the collected maintenance data to the management server via the interface when the collection of the maintenance data has succeeded.

Hereinafter, an embodiment of an image forming apparatus capable of collecting and transmitting maintenance data at a predetermined timing without losing an image forming job, and a control method therefor will be described with reference to the drawings. In the drawings, the same reference symbols represent the same or similar portions.

FIG. 1 is an overall configuration diagram of an information processing system 1 including an image forming apparatus according to this embodiment. The information processing system 1 includes a digital multi-function peripheral (MFP) 2, which is one aspect of an image processing apparatus, a plurality of user terminals 3, and a management server 4. The digital multi-function peripheral 2, the plurality of user terminals 3, and the management server 4 are connected to each other by a network 5 such as a local area network (LAN), thus establishing the information processing system 1. The information processing system 1 may include a plurality of digital multi-function peripherals 2.

The digital multi-function peripheral 2 prints print data provided from the plurality of user terminals 3 connected via the network 5. The digital multi-function peripheral 2 also has a plurality of functions such as copying, scanning, and facsimile, in addition to the above-mentioned print function. In order to implement those functions, the digital multi-function peripheral 2 includes, as shown in FIG. 1, a printer device 21, a facsimile device 22, and a scanner device 23.

The printer device 21 forms images by an electrophotographic method, for example. In other words, the printer device 21 controls the lighting of a laser light source by using the print data processed for image formation. The printer device 21 scans and exposes a photoreceptor by a light beam emitted from the laser light source and generates electrostatic latent images. Next, the printer device 21 develops the generated electrostatic latent images by a toner and transfers the created toner images onto paper as a recording medium. The printer device 21 then passes the paper, on which the toner images are transferred, through a fixing unit heated by a fixing heater, to fix the toner images onto the paper. Subsequently, the printer device 21 performs post-processing if it is instructed, and then performs print output.

When receiving facsimile image data from the outside via the network 5, the facsimile device 22 generates print image data from the facsimile image data and outputs that data to the printer device 21. The facsimile device 22 also transmits facsimile image data, which is formed in the digital multi-function peripheral 2, to the outside via the network 5.

The scanner device 23 is disposed on the lower surface of a transparent platen (not shown). The scanner device 23 includes a motor for moving scan, and reciprocates and scans in a subscanning direction along the plane of a document. The scanner device 23 includes a lamp, a mirror, a charge coupled device (CCD) serving as a photoelectric conversion element, and the like. The lamp irradiates a document placed on the platen with light. The mirror deflects the reflected light from the document. The CCD receives the light of an optical image from the mirror and performs photoelectric conversion. The scanner device 23 moves in the subscanning direction to read the document image on the platen. The read optical image is subjected to photoelectric conversion by the CCD, subjected to predetermined processing, and then output, as print data, to a controller 26 to be described later.

The digital multi-function peripheral 2 includes a LAN interface 24 and a universal serial bus (USB) interface 25 as communication devices. The LAN interface 24 transmits and receives print data, image data, maintenance data, and the like to and from computer devices (user terminals 3, management server 4, and the like) connected thereto via the network 5.

The USB interface 25 is connected to various electronic apparatuses including USB connectors, such as a USB memory, and transmits and receives print data, image data, maintenance data, and the like to and from those electronic apparatuses.

The digital multi-function peripheral 2 includes the controller 26, a read only memory (ROM) 27, and a random access memory (RAM) 28. The digital multi-function peripheral 2 also includes input/output devices such as an operation panel 30 and an IC card reader 29.

The controller 26 is connected to the units such as the printer device 21, the facsimile device 22, the scanner device 23, the LAN interface 24, the USB interface 25, the ROM 27, the RAM 28, the IC card reader 29, and the operation panel 30. The controller 26 corresponds to the central portion of the computer. The controller 26 controls the units to implement various functions as the digital multi-function peripheral 2 according to an operating system or an application program. The controller 26 functions as a collection unit, a confirmation unit, a processing unit, and a resuming unit.

The ROM 27 corresponds to a main storage portion of the computer. The ROM 27 stores the operating system or application program described above. The ROM 27 may store the data necessary for the controller 26 to execute processing for controlling each unit.

The RAM 28 corresponds to a main storage portion of the computer. The RAM 28 stores the data necessary for the controller 26 to execute processing. The RAM 28 is also used as a work area in which the controller 26 appropriately rewrites information. The RAM 28 includes, as the work area, a number-of-printed-sheets counter N, a setting data storage unit S, a held data storage unit H functioning as a storage unit that stores print data of a held job, and the like.

The number-of-printed-sheets counter N counts the number of sheets printed in the printer device 21 (number of times of image forming) and stores this count data. The setting data storage unit S stores, for example, setting data such as thresholds for checking the lifetime of consumable parts, color information for executing a print job, a default value of a paper size or the like, network settings for communicating with the management server, and authentication settings for identifying users. The held data storage unit H stores print data (job data) of a print job (held job) waiting for a user's instruction for execution.

The IC card reader 29 reads data of an IC card carried by the user. The IC card reader 29 is, for example, a contactless near field communication device. The user passes the IC card over the IC card reader 29, and thus the IC card reader 29 reads the user ID recorded on the IC card, and the like. The user ID is unique user identification information assigned to each user so as to identify a plurality of users who use the digital multi-function peripheral 2.

The operation panel 30 includes a display 31 as one aspect of a display device, and a keyboard 32 as one aspect of an input device. The display 31 is of a touch panel type in which a touch sensor as a different aspect of the input device is disposed to be superimposed on the surface of the screen. The keyboard 32 includes a plurality of keys such as numeric keys, a start key, and a reset key. The keyboard 32 further includes a mode key for switching between a copy mode, a facsimile mode, and a printer mode of the digital multi-function peripheral 2.

The management server 4 is a server for maintenance management of the digital multi-function peripheral 2 or billing management corresponding to the number of printed sheets, and is managed by a maintenance service provider of the digital multi-function peripheral 2, for example.

Figure 2:
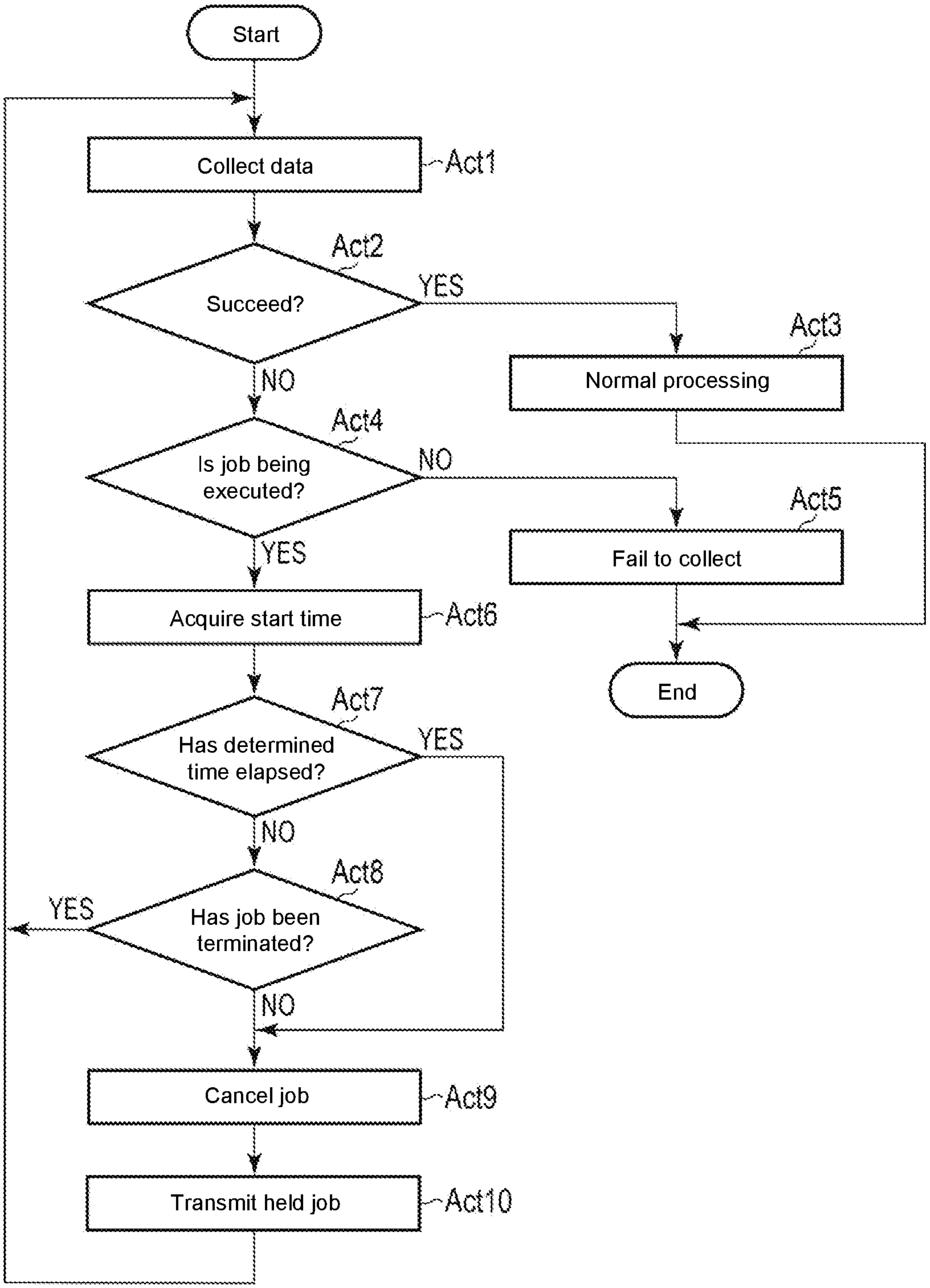
FIG. 2 is a flowchart showing processing of collecting and transmitting maintenance data by the digital multi-function peripheral according to the embodiment.

FIG. 2 is a flowchart showing processing of collecting and transmitting maintenance data by the digital multi-function peripheral 2 described above. A maintenance data collecting and transmitting program is stored in the ROM 27, for example. The maintenance data collecting and transmitting program is activated at a predetermined timing. In this embodiment, the digital multi-function peripheral 2 executes the maintenance data collecting and transmitting program at a predetermined time of day once a day, for example.

The digital multi-function peripheral 2 is inhibited from executing this maintenance data collecting and transmitting program during execution of an image forming job.

The image forming job includes a print job in the printer device 21, an image data generating job in the facsimile device 22, image reading, image data generating, and image data writing jobs in the scanner device 23, and the like. Hereinafter, the print job will be taken as an example of the image forming job to describe the processing of collecting and transmitting maintenance data.

For example, if the digital multi-function peripheral 2 tries to read count data of the number of printed sheets during execution of a print job, the data may be damaged when the number of printed sheets is written and read. Hence, the maintenance data collecting and transmitting program is inhibited from being executed during the execution of the print job. "During the execution" of the print job includes "during interruption" of the job. "During interruption" of the job means a state where the job is interrupted in the middle of the print job, such as a state where the job is interrupted due to paper out or a state where the job is interrupted due to a paper jam.

When receiving a print job from the user terminal 3 via the network 5, the controller 26 of the digital multi-function peripheral 2 stores job data of that print job in the work area of the RAM 28. Subsequently, the controller 26 controls the printer device 21 to execute the print job, store a start time of the print job by referring to a clock unit 33, and also set a flag indicating that the job is being executed. The controller 26 can determine that the print job is being executed (including the state being interrupted) by confirming that flag.

As shown in FIG. 2, when the execution of the maintenance data collecting and transmitting program is started at a predetermined time of day, in Act1, the controller 26 collects count data from the number-of-printed-sheets counter N of the RAM 28 and collects setting data from the setting data storage unit S. In the following description, those pieces of count data and setting data will be collectively referred to as maintenance data.

At that time, in Act2, the controller 26 determines whether or not the collection of the maintenance data has succeeded in Act1. If the controller 26 determines in Act2 that the collection of the maintenance data has succeeded (YES in Act2), the processing of the controller 26 proceeds to Act3. In Act3, the controller 26 transmits the collected maintenance data to the management server 4 via the LAN interface 24, as normal processing.

If the controller 26 determines in Act2 that the collection of the maintenance data has not succeeded (NO in Act2), the processing of the controller 26 proceeds to Act4. In Act4, the controller 26 confirms a flag indicating that a job is being executed, to determine whether or not the printer device 21 is executing a print job. If the controller 26 determines that the job is not being executed (NO in Act4), the processing of the controller 26 proceeds to Act5. In Act5, the controller 26 determines that the collection of the maintenance data has failed due to another cause and terminates the processing.

If the controller 26 determines that the job is being executed (YES in Act4), the processing of the controller 26 proceeds to Act6. In Act6, the controller 26 acquires a start time of the print job stored in advance. In Act7, the controller 26 determines whether or not a predetermined period of time has elapsed from the start of the print job.

If the controller 26 determines that the predetermined period of time has not elapsed (NO in Act7), the processing of the controller 26 proceeds to Act8. In Act8, the controller 26 determines whether or not the printer device 21 has terminated the print job. In other words, the controller 26 determines whether or not the print job has been terminated before the elapse of the predetermined period of time. The controller 26 determines that the print job has been terminated before the elapse of the predetermined period of time (NO in Act7 or YES in Act8), the processing of the controller 26 returns to Act1. Subsequently, the controller 26 resumes the processing of collecting the maintenance data.

If the predetermined period of time has elapsed (YES in Act7) without termination of the print job (NO in Act8), the processing of the controller 26 proceeds to Act9. In Act9, the controller 26 determines that the print job being executed is interrupted and left for a predetermined period of time, and then cancels the print job. In Act10, the controller 26 then transmits the job data of the print job to its own loopback address. The transmitted job data is written, as print data of a held job, to the held data storage unit H. Subsequently, the processing of the controller 26 returns to Act1. The processing of the controller 26 then resumes the processing of collecting the maintenance data.

As described above, according to this embodiment, if failing to collect its own maintenance data, the digital multi-function peripheral 2 can confirm a cause of the collection failure, and after determining that the cause is an interruption of a print job, cancel the print job to set the print job as a held job. Hence, according to this embodiment, it is possible to collect and transmit the maintenance data without losing the print job and to transmit the maintenance data to the management server 4 timely.

Note that the embodiment described above is not limited to the configuration described above. For example, in the embodiment described above, if failing to regularly collect maintenance data, the digital multi-function peripheral 2 confirms that a print job is being executed, and then cancels the print job after waiting for a predetermined period of time to set the print job as a held job. However, when confirming that the print job is being executed, the digital multi-function peripheral 2 may cancel the print job and set the print job as a held job.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, which transmits maintenance data as data relating to maintenance to a management server, the image forming apparatus comprising:
- an image forming device that performs various image forming jobs;
- a memory that includes
  - a counter that counts data relating to the image forming jobs executed by the image forming device, and stores the counted data as the maintenance data, and
  - a held job storage unit that stores an image forming job that is set as a held job among the image forming jobs;
- an interface that performs communication with the management server; and
- a controller configured to
  - regularly collect the maintenance data from the memory,
  - confirm, if failing to collect the maintenance data, a cause of the failure of the collection,
  - set, in response to the confirmation that the cause of the failure of the collection is an interruption of the image forming job, the image forming job as the held job,
  - resume the collection of the maintenance data in response to the setting of the image forming job as the held job, and
  - transmit the collected maintenance data to the management server via the interface when the collection of the maintenance data has succeeded.

2. The image forming apparatus according to claim 1, wherein
- the held job storage unit of the memory stores, as the held job, job data of a job waiting for an execution instruction by a user.

3. The image forming apparatus according to claim 2, wherein
- the controller is configured to
  - temporarily cancel the image forming job in response to the confirmation that the cause of the failure of the collection is an interruption of the image forming job, and
  - cause the held job storage unit to store the job data of the image forming job as the held job.

4. The image forming apparatus according to claim 1, wherein
- the controller is configured to set, if the image forming job that is the cause of the failure of the collection is still interrupted after elapse of a predetermined period of time, the image forming job as the held job.

5. The image forming apparatus according to claim 4, wherein
- the controller is configured to determine, if failing to collect the maintenance data, whether or not the predetermined period of time has elapsed from an execution start time of the image forming job.

6. The image forming apparatus according to claim 5, wherein
- the controller is configured to determine, if the predetermined period of time has not elapsed from the execution start time of the image forming job, whether or not the image forming job has been terminated, and temporarily cancel, if the predetermined period of time has elapsed from the execution start time of the image forming job, the image forming job, and set the image forming job as the held job.

7. The image forming apparatus according to claim 6, wherein the controller is configured to resume the collection of the maintenance data if the image forming job has been terminated.

8. The image forming apparatus according to claim 1, wherein the controller is configured to determine whether or not the collection of the maintenance data has succeeded after the maintenance data is collected, and determine whether or not the image forming job is being executed when the collection of the maintenance data has failed.

9. The image forming apparatus according to claim 8, wherein the controller is configured to determine, if the image forming job is not being executed, that the collection of the maintenance data has failed due to a cause other than the fact that the image forming job is being executed, and terminate the processing of collecting the maintenance data, determine, if the image forming job is being executed, whether or not a predetermined period of time has elapsed from an execution start time of the image forming job, determine, if the predetermined period of time has not elapsed, whether or not the image forming job has been terminated, and set, if the predetermined period of time has elapsed or if the image forming job has been terminated before elapse of the predetermined period of time, the image forming job as the held job.

10. A control method for an image forming apparatus that transmits maintenance data as data relating to maintenance to a management server, the control method comprising:

counting data relating to an image forming job executed by an image forming device, and storing the counted data as the maintenance data in a counter of a memory;

regularly collecting the maintenance data from the counter of the memory;

confirming, if failing to collect the maintenance data, a cause of the failure of the collection;

setting, in response to the confirmation that the cause of the failure of the collection is an interruption of the image forming job, the image forming job as a held job;

resuming the collection of the maintenance data in response to the setting of the image forming job as the held job; and transmitting the collected maintenance data to the management server via an interface when the collection of the maintenance data has succeeded.

* * * * *